United States Patent [19]

Hulmes

[11] 3,781,977

[45] Jan. 1, 1974

[54] SEMICONDUCTOR DEVICES

[75] Inventor: Harold Hulmes, Cheadle, England

[73] Assignee: Ferrant Limited, Hollinwood, Lancashire, England

[22] Filed: Sept. 8, 1971

[21] Appl. No.: 178,745

[30] Foreign Application Priority Data

Sept. 19, 1970 Great Britain..................44725/70

[52] U.S. Cl....................................... 29/584, 29/589
[51] Int. Cl.............................................. B01j 17/00
[58] Field of Search...................................... 29/584

[56] References Cited

UNITED STATES PATENTS 3,634,929 1/1972 Yoshida et al........................ 29/584

*Primary Examiner*—Charles W. Lanham
*Assistant Examiner*—W. C. Tupman
*Attorney*—Gordon W. Daisley

[57] ABSTRACT

The formation of a contact individually on at least one selected region of a semiconductor body, such as is required in the manufacture of a read-only memory store, comprises providing on each selected region a layer of contact material on a layer of insulating material, and applying a potential between the contact material and the selected region to cause the contact material to penetrate through the layer of insulating material.

4 Claims, 3 Drawing Figures

SEMICONDUCTOR DEVICES

Figure 1:
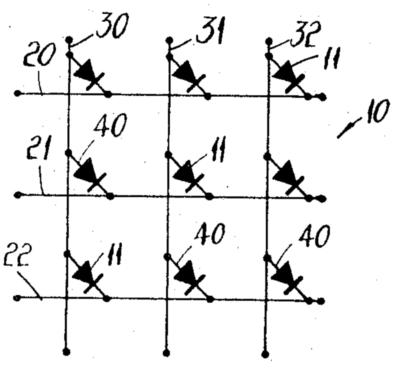

This invention relates to the manufacture of semiconductor devices having contacts on selected regions of the semiconductor bodies in wich the devices are formed, and in particular, although not exclusively, to devices comprising read-only memory stores.

A read-only memory store has an array of storage cells provided in the semiconductor body in which the device is formed, and an arrangement of lines comprising a series of input lines and a series of output lines, each cell being associated with an input line and an output line at a cross-point of the associated lines. The presence or lack of a cell connected between any cross-point of the arrangement of lines comprises the fixed information within the store. The store is programmed in a non-reversible manner by arranging for only a predetermined pattern of cells within the array to be connected between their associated lines at the cross-points of the arrangement of lines. On addressing a particular input line an output signal appears on each output line which is connected to the input line by a cell. Such a device is suitable as a code translator or as a programmed control unit. It is known to fabricate a memory store by forming within a semiconductor body an array of cells, and to provide a series of input lines and a series of output lines. All the cells initially are connected directly to corresponding lines of one series of lines and are connected by contacts on selected regions of the semiconductor body to corresponding lines of the other series of lines. The contacts are of a fusible material, such as aluminium or nichrome, each contact comprising a fusible link between a cell and its associated line of said other series of lines. In order to store the fixed information in the memory store the fusible contacts of the cells not comprising the predetermined pattern of cells individually are destroyed by passing a small current between the associated input line and the associated output line. This method, however, has the disadvantage that in the fusing operations the contact material may be sputtered over the surface of the device and may cause unintentional short circuits within the device.

It is an object of the present invention to provide a novel and advantageous construction for a semiconductor device with at least one contact on a selected region of the semiconductor body in which the device is formed, for example, the device comprising a read-only memory store.

According to the present invention a method of manufacturing a semiconductor device in a semiconductor body so as to have at least one contact on a selected region of the body includes the steps of providing a layer of insulating material on the selected region, depositing contact material on the layer of insulating material, and applying a potential difference between the contact material and the selected region to cause the contact material to penetrate through the layer of insulating material to form the desired contact.

The applied potential difference is substantially greater than any normally-encountered operating potential difference to be applied to the contact. In addition, the thickness of the layer of insulating material is arranged to be such that the layer is readily penetrated by the contact material when the potential difference is applied during the manufacturing process.

A method of manufacturing a read-only memory store of the kind possessing a series of input lines intersected by a series of output lines, with a storage cell in the form of a semiconductor device connected between the lines at each of a plurality of selected cross-over points of those lines, may include manufacturing said devices individually by the method referred to above, to form a predetermined pattern of storage cells in the semiconductor body.

According to another aspect the present invention comprises a semiconductor device when manufactured by the method referred to above.

Figure 2:
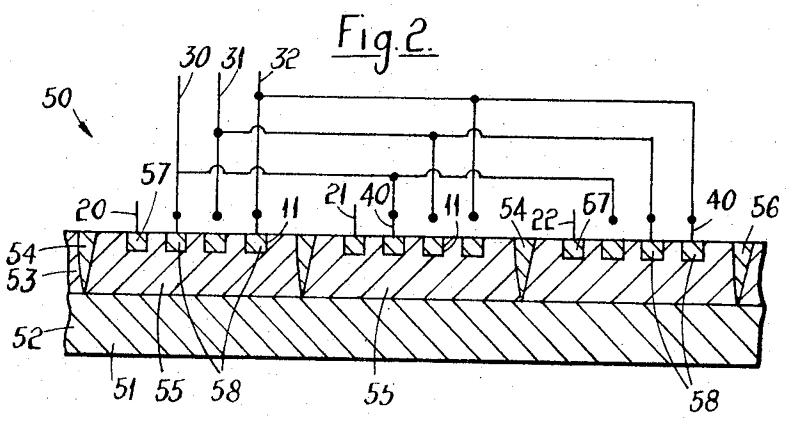
Figure 3:
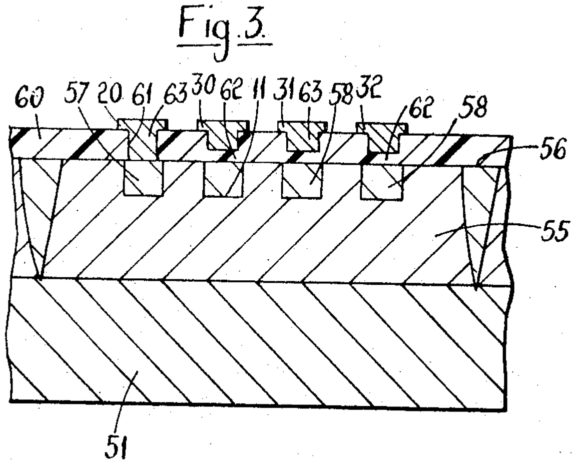

The present invention will now be described by way of example with reference to the accompanying drawings, in which FIG. 1 is a circuit diagram of a 3 × 3 diode matrix array comprising part of a read-only memory store, FIG. 2 shows diagrammatically in section the semiconductor device embodying the circuit arrangement of FIG. 1, and FIG. 3 shows in section one row of the array during the manufacture of the device.

The illustrated part of a read-only memory store comprises an array of diode cells 11, a series of input lines 20, 21 and 22 and a series of output lines 30, 31, and 32. All the cells 11 are connected directly to corresponding input lines, but only cells of a predetermined pattern of cells within the array are connected, by contacts indicated generally at 40, to corresponding output lines. Each cell of the predetermined pattern of cells is connected between its associated input line and its associaed output line at the cross-points of the associated lines. Storing fixed information in a non-reversible manner within the device comprises providing individually the contacts 40 for the predetermined pattern of cells.

The circuit arrangement of the read-only memory store is embodied in a monolithic semiconductor device 50 shown diagrammatically in section in FIG. 2. The device 50 comprises a silicon semiconductor body 51 having a substrate 52 of P conductivity type and, on the substrate, an N—type epitaxial layer 53. Through the epitaxial layer 53 are diffused P—type isolation regions 54 providing three electrically isolated N—type epitaxial regions 55. At the exposed surface 56 of each region 55 are provided by diffusion an N+ type contact region 57, and three P—type regions 58 which are spaced from each other and from the N+ type contact region 57. The diodes 11 comprise the P—N junctions between the P—type regions 58 and the bulk of each N—type region 55. The input lines 20, 21 and 22 are connected to the N+ type contact regions 57, and the output lines 30, 31 and 32 are connected via the contacts 40, where provided, to selected regions of the semiconductor body comprising some of the P—type regions 58.

The N—type region 55 associated with the input line 20 is shown in section in FIG. 3 during the manufacture of the device 50. During the diffusion of the N+ type contact region 57 and the P—type regions 58, or subsequent thereto, a passivating layer 60 of silicon oxide is provided on the surface 56 covering the otherwise exposed surface portions of the P—N junctions 11. An aperture 61 is etched through the silicon oxide layer 60 to expose part of the N+ type contact region 57. Over part of each P—type region 58 the thickness of the silicon oxide layer 60 is reduced, as indicated at 62, either by partial etching of the silicon oxide layer on the regions 57, or by forming apertures to expose parts of the regions 58, and then forming a thin layer of silicon oxide within the apertures. Aluminium contact material 63 is deposited within the aperture 61 exposing part of the N+ type contact region 57. Aluminium is also deposited on the reduced thickness portions 62 of the silicon oxide layer 61 on the P−type regions 57. The aluminium contact material 63 may be provided by evaporative deposition on the appropriate parts of the device, either by employing a mask in contact with the device, or by providing an initially-continuous layer of aluminium, which layer is then selectively etched by known photolithographic techniques to provide the aluminium parts as shown in FIG. 3.

The contact material also provides the input and output lines of the device. The input lines extend from the material in the apertures 61, and the output lines extend from the material on the reduced-thickness silicon oxide portions 62. The lines extend over the silicon oxide layer 60, and are provided simultaneously with the material in the apertures 61 and on the reduced-thickness silicon oxide portions 62.

The device 50 is completed by forming individually the contacts 40 between the cells of the predetermined pattern of cells 11 and the output lines 30, 31 and 32. Each contact 40 is provided by applying a potential difference between an output line and an input line, and hence between a selected region 58 of the body and an output line. The potential difference is substantially greater than any normally-encountered operating potential difference associated with the device, and is sufficient to cause contact material to penetrate through the reduced-thickness silicon oxide portions 62. The contact material does not penetrate through other parts of the oxide layer 60 during this process step. When each contact 40 is provided the aluminium contact material is sintered, and where it is contiguous with the silicon semiconductor body an ohmic contact is obtained. The magnitude of the potential difference applied to cause the aluminium to penetrate the silicon oxide reduced-thickness portions 62 is arranged to be such that there is no damage to the associated P−N junctions 11. Two of the three diodes 11 associated with the input line 20, as shown in FIG. 3, are connected to output lines of the store.

In one embodiment according to the present invention the reduced-thickness silicon oxide portions are 1 micron thick and the applied potential difference to cause the aluminium to penetrate through the silicon oxide portions is 50 volts.

The method of forming a contact as described above may be employed in the manufacture of any kind of semiconductor device which is required to have a contact on a selected region.

The contact material may be nichrome instead of aluminium.

The storage cells may be more complex than diodes, for example, comprising transistors or bistable elements each having a plurality of different components.

What I claim is:

1. A method of manufacturing a semi-conductor device in a semiconductor body so as to have at least one contact on a selected region of the body which includes the steps of providing a single layer of insulating material on the selected region of said semiconductor body, reducing the thickness of the insulating material over the selected region, depositing a single layer of contact material on said layer of insulating material and over the reduced thickness portion, and applying a potential difference between opposite selected points of said layer of the contact material and the selected region of said semiconductor body to cause the contact material to penetrate through the layer of insulating material at the reduced thickness portion to form the desired contact.

2. A method of manufacturing a read-only memory store of the kind possessing a series of input lines intersected by a series of output lines with a storage cell in the form of a semiconductor device connected between the lines at each of a plurality of selected cross-over points of those lines, which includes manufacturing said semiconductor devices individually by a method as claimed in claim 1 to form a predetermined pattern of storage cells in the semiconductor body.

3. A method as claimed in claim 1 in which the insulating material is silicon oxide and the contact material is aluminium.

4. A method as claimed in claim 1 in which the insulating material is silicon oxide and the contact material is nichrome.

* * * * *

PO-1050
(5/69)

UNITED STATES PATENT OFFICE
CERTIFICATE OF CORRECTION

Patent No. 3,781,977 Dated January 1, 1974

Inventor(s) Harold Hulmes

It is certified that error appears in the above-identified patent and that said Letters Patent are hereby corrected as shown below:

Cover page, item [73], "Ferrant" should read --Ferranti--.

Signed and sealed this 30th day of April 1974.

(SEAL)
Attest:

EDWARD M.FLETCHER,JR.
Attesting Officer

C. MARSHALL DANN
Commissioner of Patents